(12) United States Patent
Rock

(10) Patent No.: US 9,696,057 B2
(45) Date of Patent: *Jul. 4, 2017

(54) MEASURING HVAC EFFICIENCY

(71) Applicant: Lance Rock, Glen Ellyn, IL (US)

(72) Inventor: Lance Rock, Glen Ellyn, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/172,569

(22) Filed: Jun. 3, 2016

(65) Prior Publication Data

US 2016/0282006 A1 Sep. 29, 2016

Related U.S. Application Data

(63) Continuation of application No. 14/545,372, filed on Apr. 29, 2015, now Pat. No. 9,470,431, which is a continuation of application No. 12/800,017, filed on May 5, 2010, now abandoned.

(60) Provisional application No. 61/175,790, filed on May 6, 2009.

(51) Int. Cl.
*F24F 11/00* (2006.01)
*G01M 9/00* (2006.01)
*G01M 99/00* (2011.01)

(52) U.S. Cl.
CPC ....... *F24F 11/0086* (2013.01); *G01M 99/005* (2013.01); *F24F 2011/0045* (2013.01); *F24F 2011/0052* (2013.01)

(58) Field of Classification Search
CPC .................................................. G01M 99/005
USPC ........................................................ 702/182
See application file for complete search history.

(56) References Cited

U.S. PATENT DOCUMENTS 5,590,830 A * 1/1997 Kettler .................... F24F 3/044
165/251
2010/0114380 A1 5/2010 Kates

* cited by examiner

*Primary Examiner* — Bryan Bui
(74) *Attorney, Agent, or Firm* — Perkins IP Law Group LLC; Jefferson Perkins

(57) ABSTRACT

A method for measuring HVAC efficiency is disclosed which may be used to test various heat transfer or passive elements within a HVAC system to determine whether any element, such as a cooling coil, heating coil, filter or mixer, is operating at an acceptable efficiency when compared to design specifications or previously established standards. The method may also be used to easily determine volumetric flow rate of air through the system at various points.

6 Claims, 1 Drawing Sheet

MEASURING HVAC EFFICIENCY

RELATED APPLICATIONS

This application is a continuation of U.S. patent application Ser. No. 14/545,372 filed Apr. 29, 2015, which in turn is a continuation of U.S. patent application Ser. No. 12/800,017 filed on May 5, 2010, which is a nonprovisional patent application claiming priority to U.S. Provisional Patent Application No. 61/175,790 filed on May 6, 2009. The specification and drawings of all of the foregoing patent applications are fully incorporated by reference herein.

TECHNICAL FIELD

The present invention relates generally to heating, air conditioning and ventilation (HVAC) systems and more specifically to a method for analyzing and measuring the efficiency of such systems.

BACKGROUND OF THE INVENTION

Nearly every modern building has some form of HVAC system for heating, ventilation, air conditioning, and moving air within the building. An efficient, effective HVAC system is necessary not only for the comfort of the occupants of a building; but, as has become increasingly clear relatively recently, for the mental and physical health of such occupants. Although there are many variations of HVAC systems, in general such systems include a variety of air ducts, at least one fan for moving air, a filter, a heating coil, a cooling coil, a method of recycling air within the system (return air or R/A), a method for introducing outside air into the system (outside air or O/A), and a method for expelling air from the system (exhaust air or E/A). The filter, heating coil, cooling coil, and fan are ordinarily located together in what will be referred to here as a treatment node. The treatment node is usually located in a spot within the HVAC system which is easily accessible. Treated air leaves the treatment node in a downstream direction and is transported through a series of ducts to various locations within the building. Air enters the treatment node from upstream.

Return air (R/A) ordinarily enters the treatment node from upstream after passing through a controlled R/A damper. Exhaust air (E/A) ordinarily exits the system upstream from the R/A damper through a controlled E/A damper. Any E/A is a portion of R/A removed upstream from the R/A damper. Outside air (O/A) enters the system upstream from the treatment node and downstream from the R/A damper through a controlled O/A damper. R/A and O/A mix prior to entering the treatment node. This mix of air, referred to as total air here, passes through the filter to remove particulate matter and then is either heated or cooled as necessary by passing through the heating coil or the cooling coil with either the heating or cooling coil activated. Typically, HVAC systems are either pull-through systems where the fan is at the downstream end of the treatment node and pulls air through the treatment node, or push-through systems in which the fan pushes air through the treatment node with elements such as the heating and cooling coils located downstream of the fan.

In a conventional commercial HVAC system, various sensors track various parameters including the static pressure, temperature, humidity, and carbon dioxide content of the air within the system. These parameters are used to control the various dampers which determine the volume of R/A, E/A, and O/A. If the carbon dioxide content becomes too high, for instance, there will be more O/A and also more E/A to decrease the carbon dioxide content. Many HVAC systems have additional fans such as an exhaust fan to aid in the removal of E/A. Many residential systems do not have E/A or O/A options within the HVAC system. Many HVAC systems include an air blender upstream of the filter to mix the R/A and O/A which improves heat transfer within the treatment node.

Although there are a variety of heating and cooling methods, there is nearly always a working fluid which passes through either the heating or cooling coil. Most often a boiler heats the liquid which then passes through the heating coil. When the heating coil is activated, heated water, which is significantly hotter than the air, heats the air passing through the heating coil which causes the temperature of the water to decrease and the temperature of the air to increase. The water is returned to the boiler where it is reheated. The effectiveness of the heat transfer of the heating coil can be determined with relative ease, because the total energy which the heating coil produces may be measured and the energy actually transferred to the air may be determined using the method of the instant invention. By comparing the total energy which could have been transferred if the heating coil were 100% efficient with the amount actually transferred, the efficiency of the heating coil in its current condition may be determined. As will be understood, the same method may be used to determine the efficiency of a cooling coil or other similar element. Although there are various heating and cooling systems incorporated in HVAC systems, the operating method and method of determining efficiency are very similar.

The efficiency of an HVAC system is affected by a great many factors. Poor maintenance of ducts and equipment greatly reduces efficiency. Clogged or dirty filters, heating coils, or cooling coils also greatly reduce the efficiency of an HVAC system. It is currently relatively easy to determine whether an HVAC system is operating, generally, more or less efficiently than it operated at a previous time. For example, if the boiler burned X gallons of fuel to heat the building for twenty-four hours last year when the outside temperature was twenty-six degrees and this year the boiler burns 1.5× gallons of fuel to heat the building at the same outside temperature, the efficiency of the systems has been greatly reduced. However, it is believed to be nearly impossible at the current time to determine the operating efficiency of the various elements of an HVAC system, including filter, heating coil, and cooling coil separately with any accuracy. For example, it is not currently possible to accurately measure the effect of changing the filter or filters. The same applies, for instance, to cleaning the heating or cooling coil. At the current time it is even relatively difficult to determine the actual air flow within an HVAC system.

Using the current state of the art, it is very difficult to obtain correct measurements to either determine the efficiency of the elements of an HVAC system or even to determine the air flow through the system. The volumetric air flow through a conventional HVAC system is usually measured by measuring the velocity pressure just downstream of the treatment node using a pitot tube. Many measurements must be taken across a cross section of a duct such that a matrix of measurements are taken. Generally, the more measurements taken the more accurate this method of measuring becomes. This method is expensive and time consuming because a large number of measurements are required to be taken; and it is not particularly accurate because the air is ordinarily not thoroughly mixed at this point in the system and human error often becomes a factor.

Because of fuel costs and various other factors, conservation of energy is and, most likely, always will be extremely important. A significant portion of our total energy use is wasted by inefficient HVAC systems. If, for instance, the cooling coil in an HVAC system is not cleaned or replaced when it should be or is cleaned or replaced when it isn't necessary, energy or money is wasted. If an HVAC system is poorly designed or doesn't actually operate as well as it should considering the design parameters, energy is wasted.

SUMMARY OF THE INVENTION

The method for measuring HVAC efficiency of the instant invention solves the above problems by providing a method for determining the operating efficiency of separate elements of the HVAC system including, but not limited to, the filter, heating coil, and cooling coil at any time. The ideal invention should also provide a simple and accurate method for determining air flow within an HVAC system. The ideal invention should also provide a method for quickly and easily determining whether a newly created or reworked HVAC system is operating within its design parameters or how much its performance has been improved. It should also be simple, reliable, inexpensive, and easy to operate and maintain.

The method for measuring HVAC efficiency of the instant invention is intended to be used either with a new system or with an existing system. In this case HVAC "efficiency" might, more accurately, be considered the change in heat exchange efficiency. The elements and necessary instrumentation for the method work on existing systems with relatively little interference with existing elements. The method of the instant invention may be used to measure the volumetric flow rate of air through an HVAC system more easily, efficiently, and accurately than methods currently in use. The method of the instant invention may also be used to determine the change in operating efficiency of virtually any element within the HVAC system. These elements include, but are not limited to, heating coils, cooling coils, air blenders, and filters.

The efficiency of a particular element of an HVAC system may be determined using the instant method by isolating the element and measuring the change in air enthalpy (h) in the air within the system. For a water heating coil, for example, the temperature of the water entering the coil and the temperature of the water leaving the coil is measured. The volumetric flow rate of water passing through the coil is also measured. Using these measurements, the enthalpy change associated with the HVAC system by the hot water may easily be calculated (if volumetric air flow rate is known) using a well-known formula for heat transfer based upon the first law of thermodynamics, particularly the first law of thermodynamics applied to an open system operating at steady state. Of course, there are other types of heating elements, but the principle of operation of the instant invention is the same. After the system has reached steady state, these measurements are taken with all the elements turned off and then again with only the element under consideration turned on. The enthalpy of the air in the HVAC system is measured downstream of the element, such as a heating coil, with all the elements turned off and again with the single element under consideration, for example the heating coil only, turned on. The fan should remain running during this procedure both with all the elements turned off and with the single element turned on and the fan will continue to run until the system reaches a steady state condition. Using these measurements and calculations explained in further detail below, the actual operating efficiency of the element under consideration may be compared to the original design efficiency. Although they are relatively new, instruments which directly measure enthalpy are readily available. Previously, enthalpy was measured by measuring wet and dry bulb temperature using widely available charts to find enthalpy.

For example, heat transfer between a heating coil and system air is reduced if the heating coils have become fouled with insulating particulates such as dirt. With the fan running and with all elements turned off, the HVAC system is run until it reaches steady state which is ordinarily fifteen or twenty minutes. The enthalpy is measured using any of a number of conventional instruments which are readily available at a point downstream of the heating coil. For best results, this downstream point is at a position where the temperature across a cross section of the duct varies less than 0.5 degrees F. The heating coil is then activated and the system again allowed to reach steady state. The enthalpy measured again at the same location, and the difference between the two enthalpy measurements is delta enthalpy due only to the heating coil. The temperature of the water entering and leaving the heating coil is measured along with the volumetric flow rate of the water passing through the heating coil. Using the well-known formulae and calculations described below, the enthalpy changed by the heating coil may be determined. If the heating coil were operating at design specifications, the delta enthalpy measured within the HVAC system should be equal to the enthalpy produced by the heating coil working fluid. The difference between the delta enthalpy and the enthalpy produced by the heating coil is a measure of the current effectiveness of the heating coil. Cleaning a dirty coil, for example, may increase the efficiency of the heating coil.

In a second embodiment of the instant invention the same measurements may be used to accurately determine the volumetric flow rate through the HVAC system in the treatment node. However, an additional measurement must be taken. Enthalpy must also be measured directly downstream of the supply duct. This method of measuring air flow in an HVAC system is believed to be much superior to the current method which involves measuring a pressure grid using a large number of measurements using a pitot tube of anemometer.

One of the major objects of the present invention is to provide a method for determining the operating efficiency of separate elements of the HVAC system including, but not limited to, the filter, heating coil, and cooling coil at any time.

Another objective of the present invention is to provide a simple and accurate method for determining air flow within an HVAC system.

Another objective of the present invention to provide a method for quickly and easily determining whether a newly created or reworked HVAC system is operating within its design parameters or how much its performance has been improved.

Another objective of the present invention is to provide a method for measuring HVAC efficiency which is simple, reliable, inexpensive, and easy to use and maintain.

These and other features of the invention will become apparent when taken in consideration with the following detailed description and the drawings.

DETAILED DESCRIPTION

Figure 1:
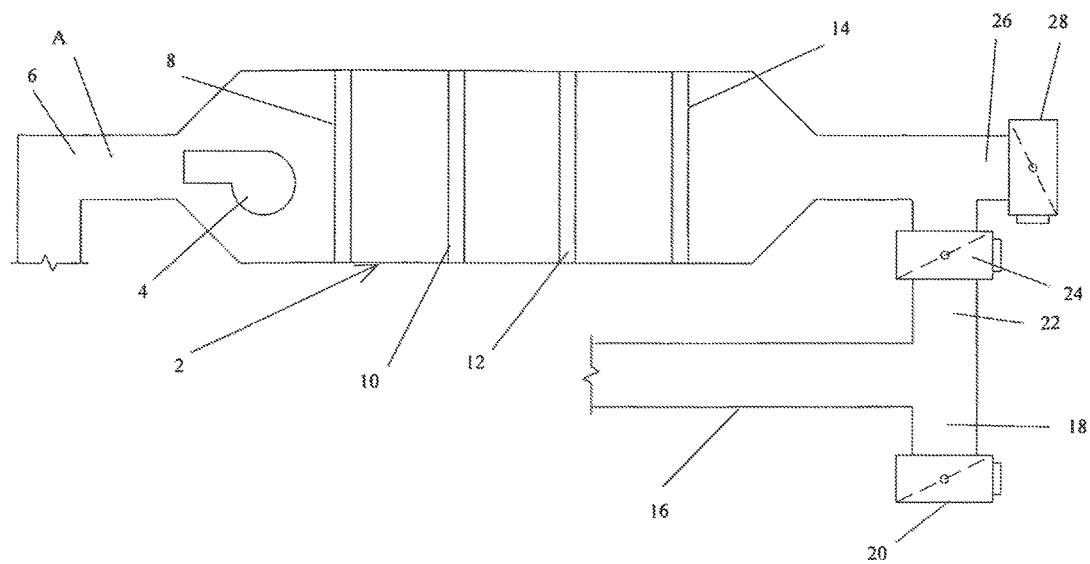
FIG. 1 is a schematic view of a typical pull-through HVAC system.
Figure 2:
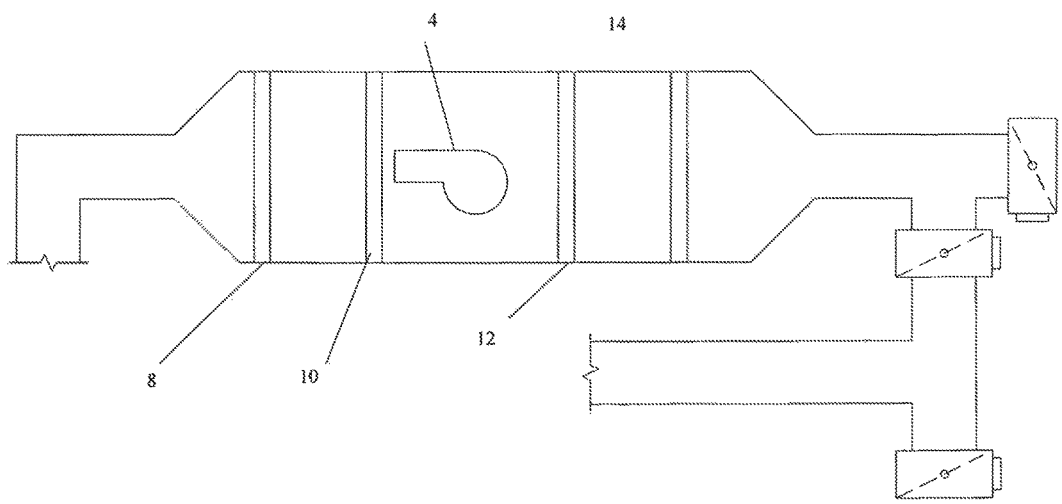
FIG. 2 is a schematic view of a typical push-through HVAC system.

Referring to the drawings, in FIGS. 1 and 2 there are shown schematic views of pull-through and push-through HVAC systems. These Figures are intended to be representative of typical HVAC systems and to show the most commonly found elements within those systems. It is the method of analysis of such systems which is considered to be the invention rather than the systems themselves. The method of the instant invention analyzes and evaluates various elements of such systems including, for example, heating coils, cooling coils, and filters; but the method should work equally well with any element which causes a change in the enthalpy of the system air between the upstream side of the element and the downstream side of the element.

Now referring to FIG. 1, a schematic view of a typical pull-through HVAC system is shown. A treatment node 2 is ordinarily located in an area which allows relatively easy access, but is usually totally enclosed inside a duct. A fan 4 is located near the downstream end of the treatment node 2 which pulls air through said treatment node 2 and pushes treated air through a series of ducts 6 throughout the building to locations where treated air is required. A cooling coil 8 is ordinarily located within said treatment node 2 just upstream of the fan 4. Most often a liquid, such as water, is chilled in some manner and directed through the cooling coil 8. The method of cooling the liquid is not considered important to the instant invention as long as there is a cooling coil 8 or any other element which performs the same function within said treatment node 2. A heating coil 10 is ordinarily located within said treatment node 2 just upstream of said cooling coil 8. Most often a liquid, such as water, is heated in some manner and directed through the heating coil 10. The method of heating the liquid is not considered important to the instant invention as long as there is a heating coil 10 or any other element which performs the same function within said treatment node 2 such as a heating coil.

Still referring to FIG. 1, a filter bank 12 is ordinarily located within said treatment node 2 just upstream of said heating coil 10. One or more filters within the filter bank 12 act to remove particulates and other unwanted solid matter from the air stream. When filters become clogged, the efficiency of the HVAC system goes down because it becomes more difficult to pull air through the system. Many modern HVAC systems include an air blender 14 located within said treatment node 2 just upstream of said filter bank 12. Air entering a treatment node 2 often has separate layers which may have different properties including significant differences in temperature. Such layers make heat transfer at said heating coil 10 and said cooling coil 8 less efficient. An air blender 14 reduces such layering and makes the heat transfer significantly more efficient by making the air temperature more uniform across the duct 6.

Still referring to FIG. 1, air returning to said treatment node 2 from the building through the ducts 6 enters an R/A duct 16 upstream of said treatment node 2. Quite often, depending upon the condition of the air inside and outside the building, some of this air is exhausted from the system as E/A 18 through an E/A damper 20. There may be an E/A fan (not shown) to accomplish this process. The remaining air (return air), R/A 22, passes through an R/A damper 24 and combines with outside air, O/A 26, which enters the system through an O/A damper 28. This mixture of R/A 22 and O/A 26 is pulled through said treatment node 2, treated, and pushed through said ducts 6.

Referring now to FIG. 2, a schematic view of a typical push-through HVAC system is shown. Such systems are the same in all respects to the system shown in FIG. 1 except that said fan 4 is located upstream from said cooling coil 8 and said heating coil 10. In this Figure said fan 4 is located downstream from said filter bank 12 and said air blender 14, but it may also be located upstream from either of both of these elements as well.

In both the pull-through and push-through HVAC systems disclosed in FIG. 1 and FIG. 2, various sensors and controls are nearly always included, but are not considered a part of the invention and are not shown. For example, the various dampers, said exhaust damper 20, said R/A damper 24, and said O/A damper 28, are usually opened or closed by a controller in response to feedback from sensors located within the system. In order for the method of measuring HVAC efficiency of the instant invention to work properly, it is necessary that an HVAC system to have some means of activating and deactivating the various elements such as said cooling coil 8 and said heating coil 10.

Referring again to FIG. 1, the method of measuring HVAC efficiency of the instant invention is described here for said heating coil 10, but the same method may be used to determine the efficiency of various other elements of the system. All of the elements which have a direct and significant effect upon the enthalpy of the air flowing through the system are deactivated and the system run until the system reaches steady state. That is, the temperature of the air (both wet and dry bulb) at a particular point within the system remains relatively constant. The enthalpy ($h_{off}$) is measured at point A which is downstream of the element to be tested. For best results, point A is the nearest point to said heating coil 10 where the temperature across a cross section of said duct 6 varies less than 0.5 degrees F. Said heating coil 10 is then activated and operated at full capacity until the system reaches steady state while the other elements remain deactivated. The same measurement repeated to obtain $h_{on}$. The efficiency of said heating coil may be found by the following equation:

$$\eta = ((h_{on} - h_{off})/h_{off}) \cdot 100\%$$

Rather than measuring the total air flow within the system using pitot tubes as it is conventionally measured; air flow may be determined using the delta enthalpy calculation described above along with well-known total heat (Q) formulas. If, for example, the heating coil were to be used for determining air flow, the volumetric flow rate of the water (V) through the coil would be measured as well as the change in temperature (7) between the water entering the coil and the water leaving the coil. The total heat (Q) can be determined using the following formula:

$$Q\left(\frac{BTU}{hr}\right) = V_{water}\left(\frac{G}{\min}\right) \cdot 60\left(\frac{\min}{hr}\right) \cdot 8.33\left(\frac{lb}{G}\right) \cdot 1\left(\frac{BTU}{lb \cdot ^\circ F.}\right) \cdot \Delta T(^\circ F.)$$

"G" is gallons. The constants used in the above equation are for systems operating at sea level and adjustments will have to be made for systems operating significantly above sea level. Although water is used in the above example (8.33 lb/gal), the same equation (with different constants) may be used for other cooling or heating means. If, for instance, glycol were used instead of water, the similar known values for glycol would be used rather than that of water. The above formula is derived from $Q = m^* c_p^* \Delta T$.

This total heat value (Q) (from the above equation) can be used to determine air flow using the following formula which is well known in the art:

$$Q \text{ (BTU/hr)} = V_{airflow} \text{ (cf/min)} \cdot 4.5 \text{ ((min·lb)/(hr·cf))} \cdot \Delta h \text{ (BTU/lb)}$$

The value of Q in the above equation is the same as the value of the Q of the water as determined in the previous formula. The Δh value is the change in enthalpy of the air. The air flow may be found by solving the above equations for $V_{airflow}$:

$$V_{airflow} \text{ (cf/min)} = (Q \text{ (BTU/hr)})/(4.5 \text{ ((min·lb)/(hr·cf))} \cdot \Delta h \text{ (BTU/lb)})$$

Again, the constant 4.5 will vary depending upon conditions (such as height above sea level and change in density) and units, but may be determined with relative ease.

The above formulae are simply versions of the first law of thermodynamics with elements which are deemed to be insignificant to the instant invention left out of the equation. In its simplest form the above formula may be written as:

$$Q_{water} = M_{air} * \Delta h$$

where Q equals the rate of change of energy, M equals the mass flow rate of air, and Δh equals the change in enthalpy with the element under consideration on and with the element under consideration off. $Q_{air}$ is equal to Q previously calculated for water in the heating coil. The equation may then be solved for $M_{air}$ which is the mass flow rate and the flow rate may be calculated using the known density.

The following example should serve to make the method of the instant invention clear. Assume that an HVAC system has a hot water heating coil and that element is to be tested. All elements are turned off and the system run until equilibrium or steady state is reached. That is, the temperature of the air (both wet and dry bulb) within the system remains relatively constant. The enthalpy of the air is measured just downstream of said treatment node 2 at about point A on FIG. 1. Point A should be the point closest to the hot water heating coil where the temperature is relatively constant (within 0.5 degrees F.) across a cross section of said duct 6. Assume that this measurement shows an enthalpy (h) of 24 BTU/lb. Measurements are also taken to insure that the heating coil is off. That is, there is no hot water flow into the heating coil and there is no change in temperature across the coil. The heating system is then turned on to maximum capacity and the HVAC system again allowed to reach steady state. The flow of hot water through the heating coil is measured at 8.7 gallons per minute. The temperature of the input water is measured at 97° F. and the output water is measured at 81° F. The enthalpy at point A now measures 34. Note that said fan 4 should remain running both while all elements are turned off and while the hot water heating coil is turned on.

These values may be plugged into the above formula as follows:

$$Q \text{ (BTU/hr)} = 8.7 \text{ (G/min)} \cdot 60 \text{ (min/hr)} \cdot 8.33 \text{ (lb/G)} \cdot 1 \text{ (BTU/(lb·° F.))} \cdot 16(° F.)$$

or Q=69,572 BTU/hr.

The above equation provides the total heat transferred from the water to the air flowing through the system. This total heat value (Q) can be used to determine air flow using the following formula:

$$Q \text{ (BTU/hr)} = V_{airflow} \text{ (cf/min)} \cdot 4.5 \text{ ((min·lb)/(hr·cf))} \cdot \Delta h \text{ (BTU/lb)}$$

The air flow may be found by solving the above equations for $V_{airflow}$:

$$V_{Airflow} \text{ (cf/min)} = Q \text{ (BTU/hr)}/(4.5 \text{ ((min·lb)/(hr·cf))} \cdot \Delta h \text{ (BTU/lb)})$$

Δh is 34−24 or 10. Q is 69,572 BTU/hr. Plugging these values into the above equation results in:

$$V_{Airflow} \text{ (cf/min)} = (69,572 \text{ ((BTU/hr))}/(4.5 \text{ ((min·lb)/(hr·cf))} \cdot 10 \text{ (BTU/lb)})$$

or $V_{Airflow}$=1546 cfm.

Note that the air flow calculation is not strictly necessary for examining the heating coil efficiency, but is shown here as part of the example. Assume that the heating coil is rated to transfer 110,000 BTU/hr. By comparing this figure with the actual figure of 69,572 BTU/hr it is possible to determine that the heating coil is operating at about 62% design efficiency. Next the heating coil must be examined to determine which of several well-known problems are making the coil so inefficient. The coil may be covered with insulating dirt, the coil may be corroded, the boiler may not be providing sufficient hot water, or the air flowing through the heating coil may need to be blended prior to passing through the coil. In the case of this example, the coils were dirty and cleaning the coils changed the temperature of the water leaving the coil from 81° F. to 73° F. which changed Q to 104,400 which is much closer to the coil's rating. This same basic method may be used for other HVAC elements such as cooling coils. Note that the constant in the above formula, 4.5, may have to be changed using well established procedures depending upon height above sea level. Also note that the above calculations and formulae could also be used, using the same techniques to test whether a new HVAC systems meets specified operating parameters.

The above described method of measuring efficiency applies to elements which are considered passive here as they do not, by themselves, significantly affect the enthalpy of the air in the system. For example, the inefficiency of the coil described above may be caused by inadequate mixing of the air just upstream of the coil. If so, the addition of an upstream air mixer may solve the problem and increase the efficiency of the coil. That is, the air mixer does not, by itself, significantly increase the enthalpy of the system, but it may increase the amount of heat transfer between the air within the system and the coil. As stated, the efficacy of the addition of an air mixer can be determined by using the above method, however, rather than cleaning the coil as described above, the air mixer is added. Otherwise the step is the same. Another example of such a passive element might be cleaning or changing an air filter.

For heating elements the sensible heat formula may also be used to calculate the actual airflows by using the total heat from the water system in conjunction with the measured temperature found at the same location as the enthalpy described above. This well-known equation is as follows:

$$Q \text{ (BTU/hr)} = V_{Airflow} \text{ (cf/min)} \cdot 1.08 \text{ ((BTU·min)/(hr·cf·° F.))} \cdot \Delta T_{db}(° F.)$$

Again the air flow is found by solving the above equation for $V_{Airflow}$.

$$V_{Airflow} \text{ (cf/min)} = Q \text{ (BTU/hr)}/((1.08 \text{ (BTU·min)/(hr·cf·° F.))} \cdot \Delta T_{db}(° F.))$$

The term $\Delta T_{db}$ is the dry bulb temperature taken at point A as described above.

All instruments of the method for measuring HVAC efficiency are conventional and may be easily purchased at any of a number of scientific instrument providers.

While preferred embodiments of this invention have been shown and described above, it will be apparent to those skilled in the art that various modifications may be made in these embodiments without departing from the spirit of the present invention. That is, the method could be used for a wide variety of purposes either in combination or separately.

I claim:

1. A method for measuring HVAC efficiency for use with an HVAC system which includes at least one fan for moving air through the system, at least one heat transfer element which acts to effect heat transfer to or from the air within the system, wherein the direction which the fan forces the air through a duct within the HVAC system is considered downstream, the method comprising the steps of:
   (a) turning off all heat transfer elements;
   (b) after step (a), running the fan until the system reaches a steady state condition;
   (c) after step (b), measuring the enthalpy of the air within the HVAC system at a predetermined point in the duct downstream from all heat transfer elements;
   (d) after step (c), turning on a selected heat transfer element to be measured;
   (e) after step (d), running the HVAC system until it reaches steady state;
   (f) after step (e), measuring the heat transfer rate introduced to the HVAC system by the selected heat transfer element;
   (g) after step (f), measuring the enthalpy of the air within the HVAC system at the predetermined point;
   (h) using the measured heat transfer rate caused by the selected heat transfer element and the change in enthalpy of the system air to calculate the air flow within the HVAC system;
   (i) after step (h), adding a passive element to the system or modifying a preexisting passive element in the system, the passive element not acting to significantly effect heat transfer to or from the air within the system;
   (j) after step (i), running the HVAC system until it reaches a steady state;
   (k) after step (j), measuring the enthalpy of the air within the HVAC system at the predetermined point;
   (l) after step (i), measuring the heat transfer rate of the selected heat transfer element;
   (m) after step (l), determining the change in the heat transfer rate introduced to the HVAC system by the introduction or modification of the passive element performed by step (i);
   (n) after step (m), using the change in heat transfer rate and the change in enthalpy to calculate the air flow within the HVAC system; and
   (o) using the change in the heat transfer rate and the change in air flow between those values for the HVAC system obtained prior to step (i) and those values for the HVAC system obtained at steps (m) and (n) to determine the efficacy of the addition or modification of the passive element.

2. The method of claim 1 wherein the selected heat transfer element is a heating or cooling coil.

3. The method of claim 1, wherein the passive element is a filter or a mixer.

4. A method for measuring HVAC efficiency for use with an HVAC system which includes at least one fan for moving air through the system and at least one heat transfer element which acts to effect heat transfer to or from the air within the system, wherein the direction which the fan forces the air through a duct within the HVAC system is considered downstream, the method comprising the steps of:
   (a) turning off all heat transfer elements;
   (b) after step (a), running the fan until the system reaches a steady state condition;
   (c) after step (b), measuring the enthalpy of the air within the HVAC system at a predetermined point downstream from all heat transfer elements;
   (d) turning on a selected heat transfer element;
   (e) after step (d), running the HVAC system until it reaches steady state;
   (f) after step (e), measuring the heat transfer rate introduced to the HVAC system by the selected heat transfer element;
   (g) comparing the measured heat transfer rate of the selected heat transfer element to a rated heat transfer rate of the selected heat transfer element;
   (h) if the difference between the actual heat transfer rate of the selected heat transfer element and the rated heat transfer rate of the selected heat transfer element is more than a predetermined value, investigating the HVAC system to determine possible causes for the difference;
   (i), after step (h), inserting into the system a passive element or modifying a passive element already present in the system, the passive element not acting to significantly effect heat transfer to or from the air within the system;
   (j) after step (i), running the HVAC system until it reaches steady state;
   (k) after step (j), measuring the enthalpy of the air within the HVAC system at the predetermined point;
   (l) after step (j), measuring the heat transfer rate of the selected heat transfer element;
   (m) after step (l), determining the change in the heat transfer rate introduced to the HVAC system by the introduction or modification of the passive element performed by step (i);
   (n) using the change in the heat transfer rate determined at step (m) and the change in enthalpy to calculate the air flow within the HVAC system; and
   (o) using the change in the heat transfer rate and the change in air flow between those values calculated for the HVAC system before adding or modifying the passive element and after adding or modifying the passive element to determine the efficacy of the addition or modification of the passive element.

5. The method of claim 4, wherein the selected heat transfer element is a heating coil or a cooling coil.

6. The method of claim 4, wherein the passive element is a filter or a mixer.

* * * * *